Oct. 24, 1944.    R. SAHLE    2,360,982
REVERSIBLE SCREW PROPELLER OPERATING MECHANISM
Filed July 3, 1942    9 Sheets-Sheet 1

Inventor
ROLFE SAHLE
By Malcolm F. Gannett
Attorney

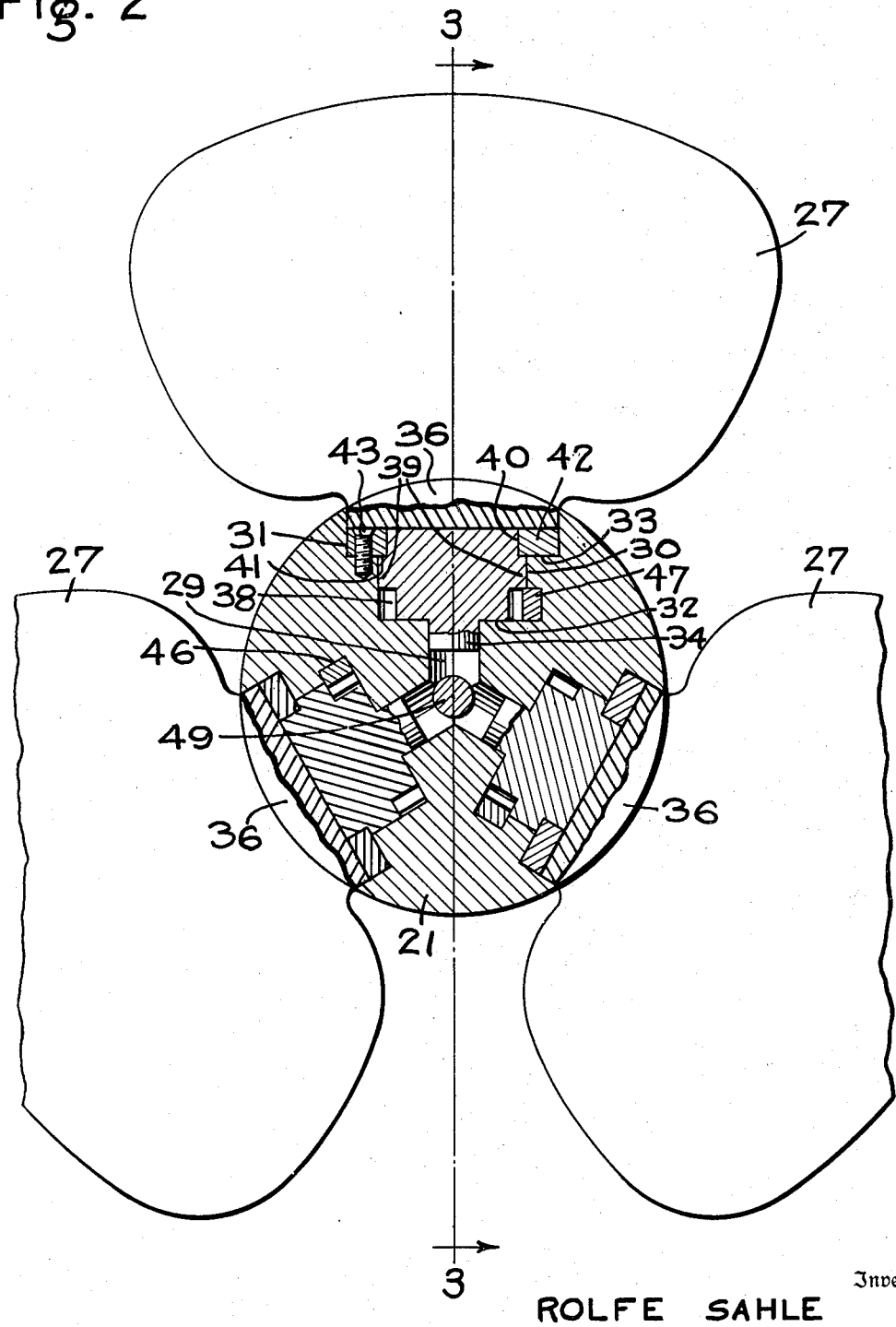

Oct. 24, 1944.   R. SAHLE   2,360,982
REVERSIBLE SCREW PROPELLER OPERATING MECHANISM
Filed July 3, 1942   9 Sheets-Sheet 3
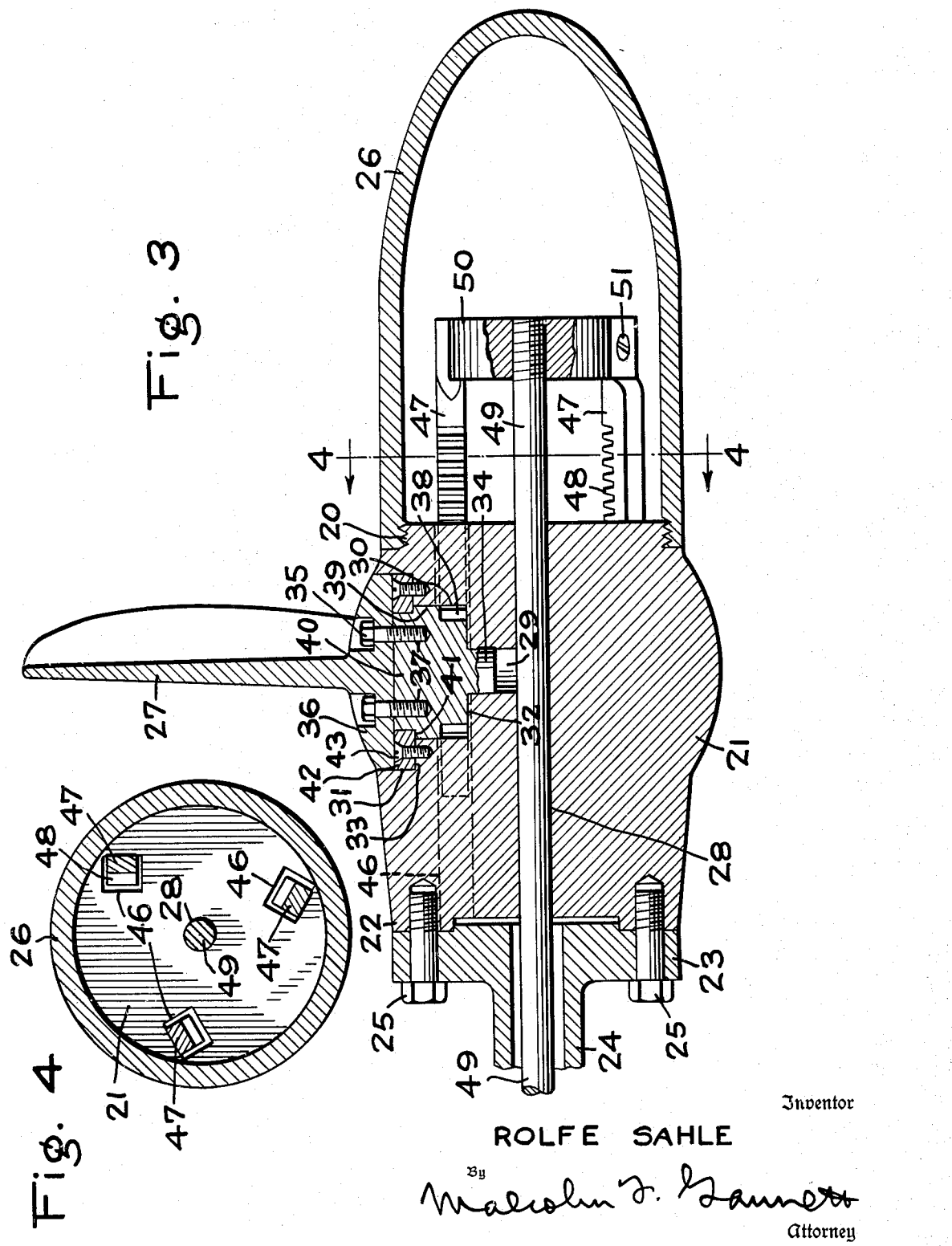
Inventor
ROLFE SAHLE
By Malcolm F. Gannett
Attorney Oct. 24, 1944.                R. SAHLE                2,360,982
              REVERSIBLE SCREW PROPELLER OPERATING MECHANISM
                   Filed July 3, 1942         9 Sheets-Sheet 4
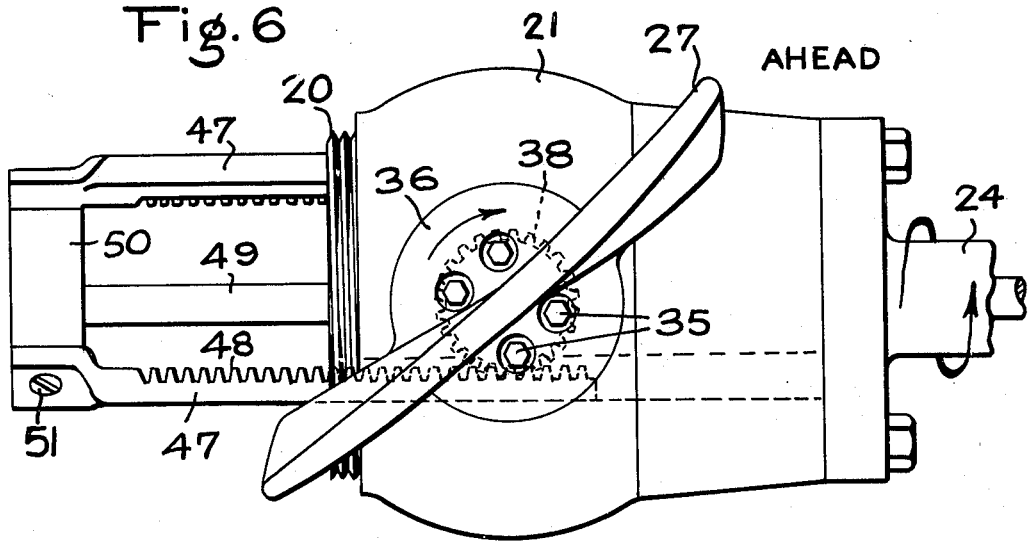
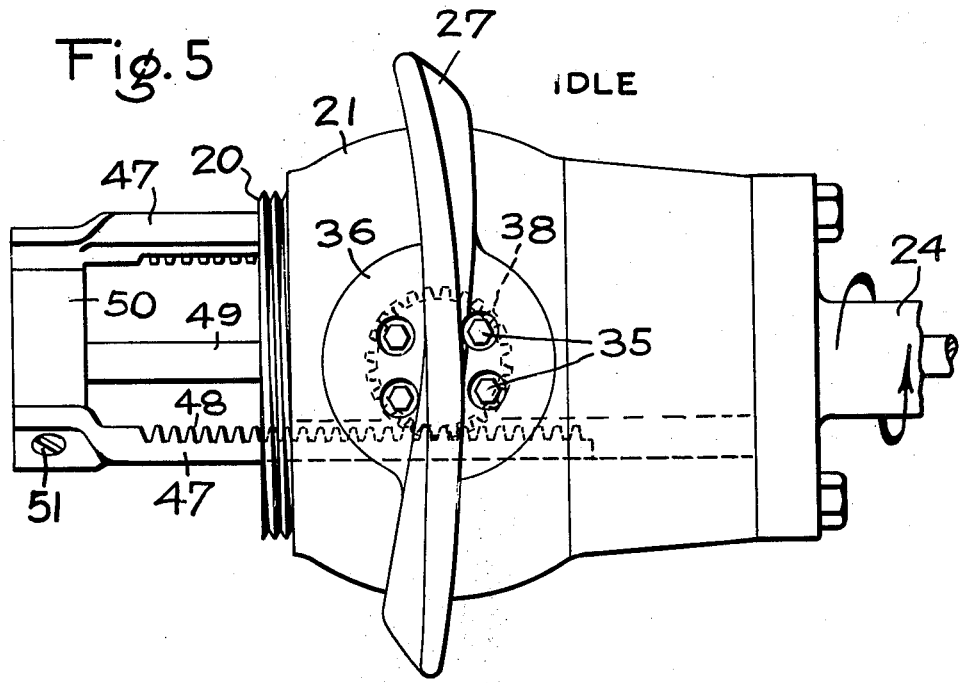
Inventor
ROLFE SAHLE Oct. 24, 1944. R. SAHLE 2,360,982
REVERSIBLE SCREW PROPELLER OPERATING MECHANISM
Filed July 3, 1942 9 Sheets-Sheet 5
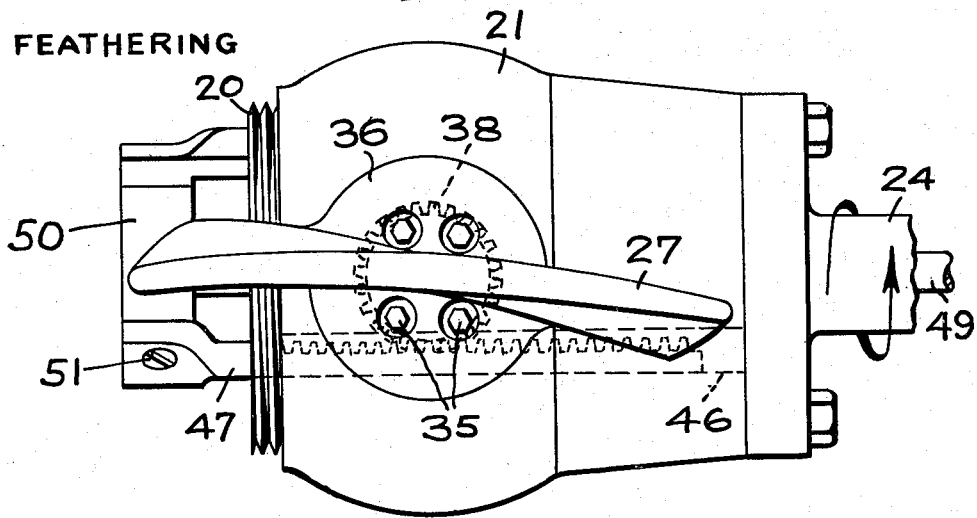
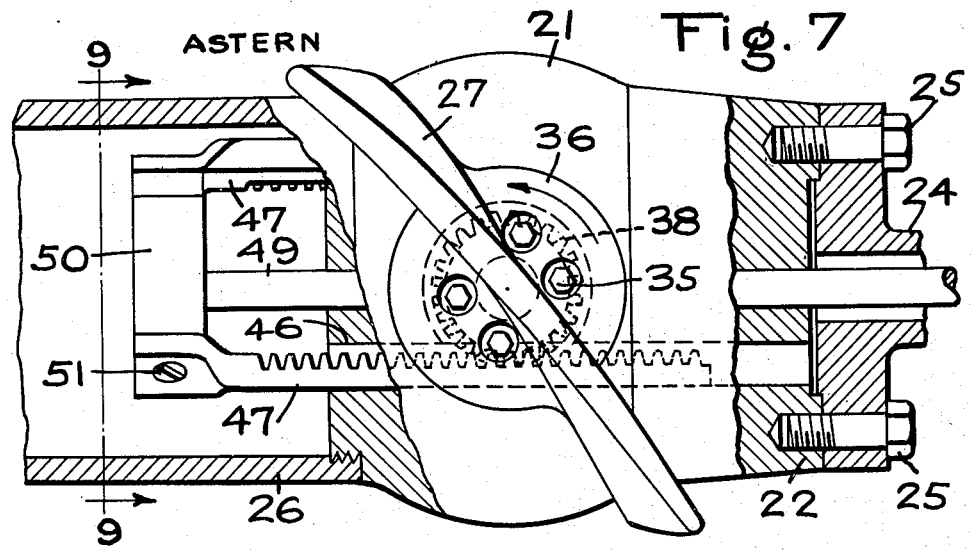
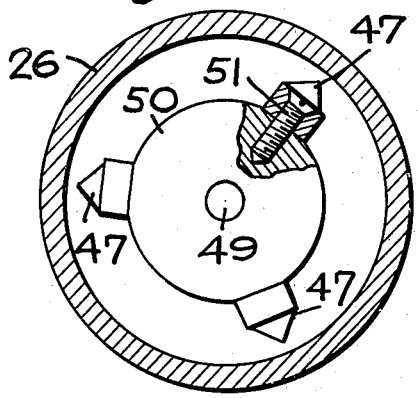
Inventor
ROLFE SAHLE
By Malcolm F. Gannett
Attorney

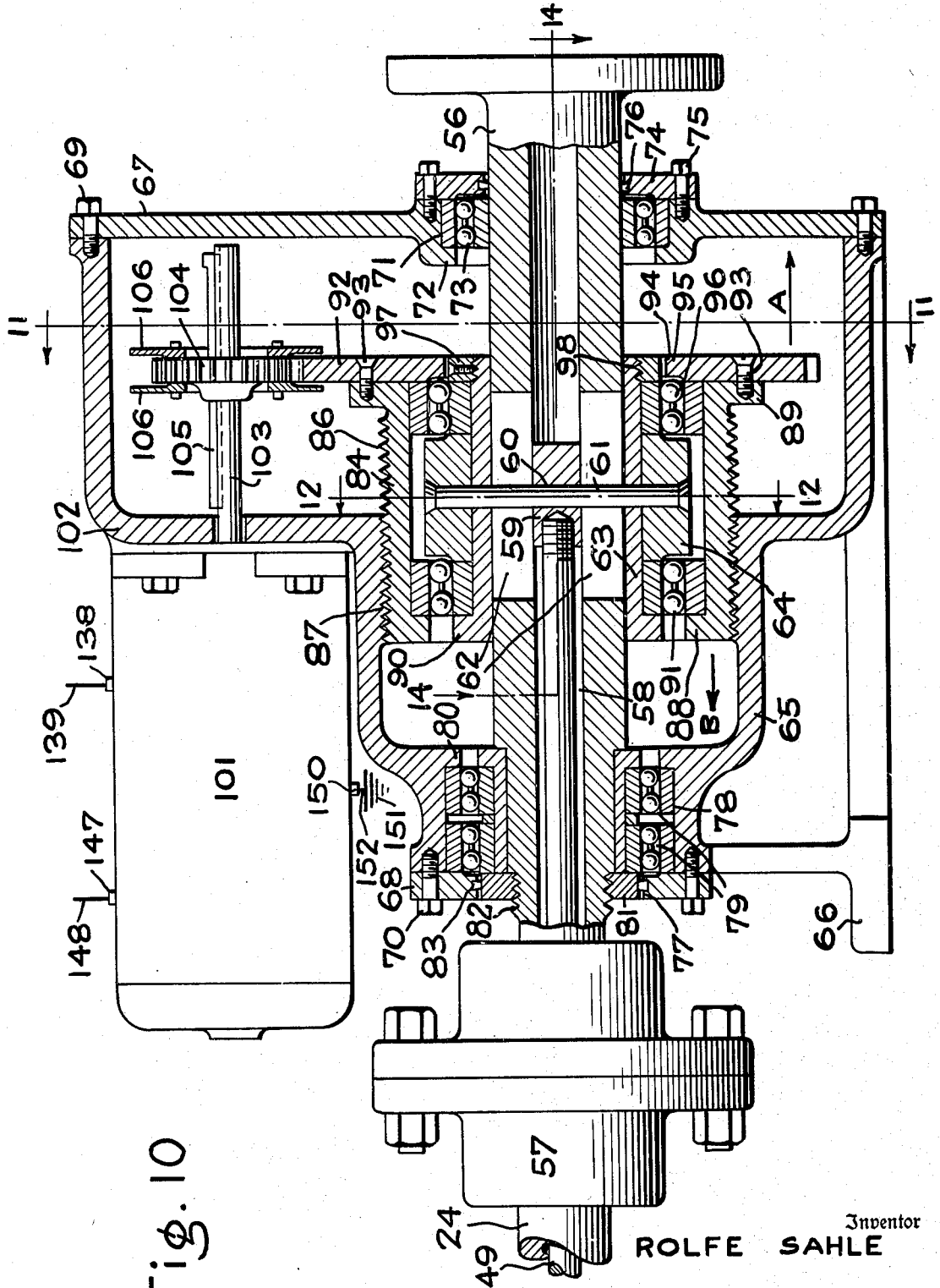

Oct. 24, 1944.　　　　R. SAHLE　　　　2,360,982
REVERSIBLE SCREW PROPELLER OPERATING MECHANISM
Filed July 3, 1942　　　9 Sheets-Sheet 7

Inventor
ROLFE SAHLE
By Malcolm F. Gannett
Attorney

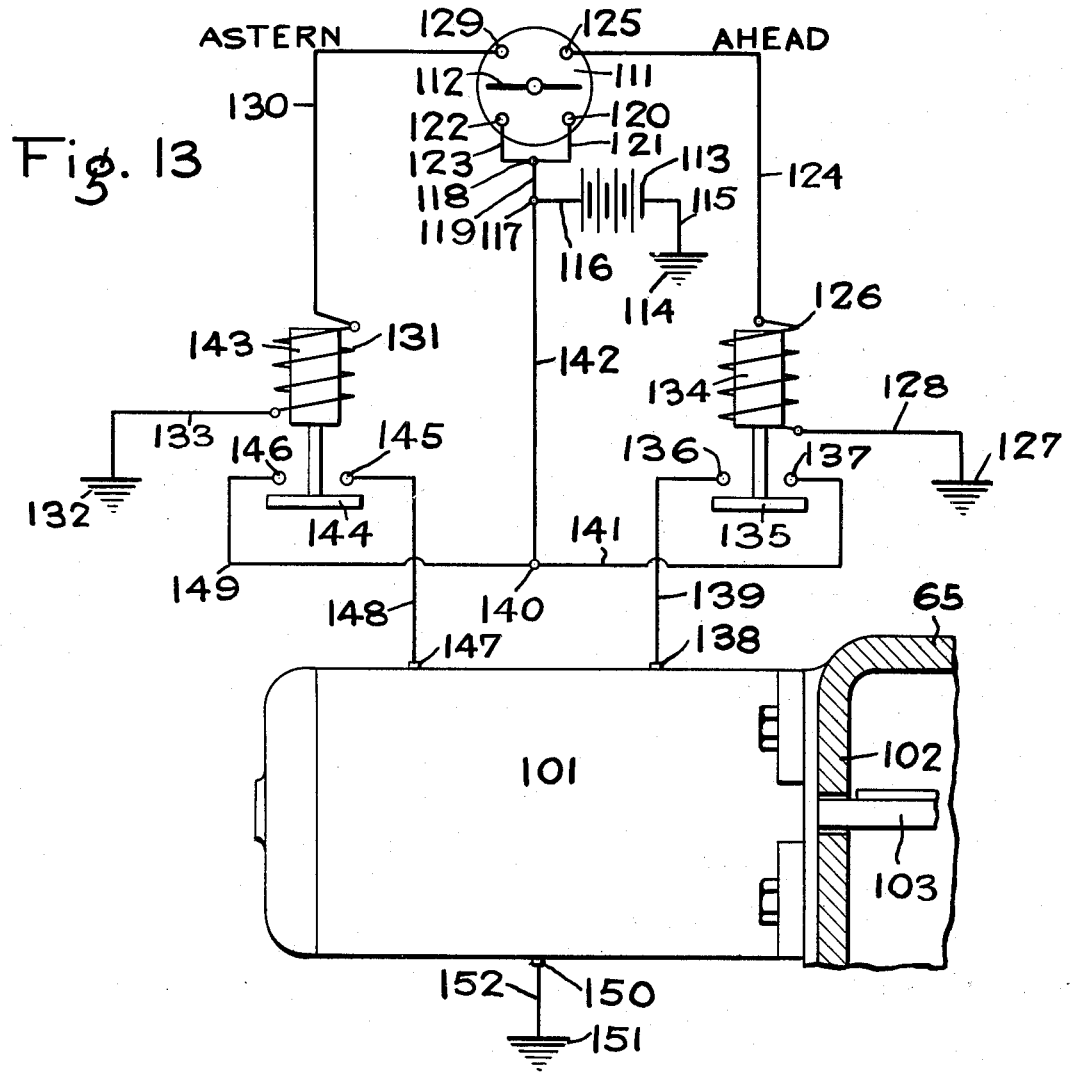
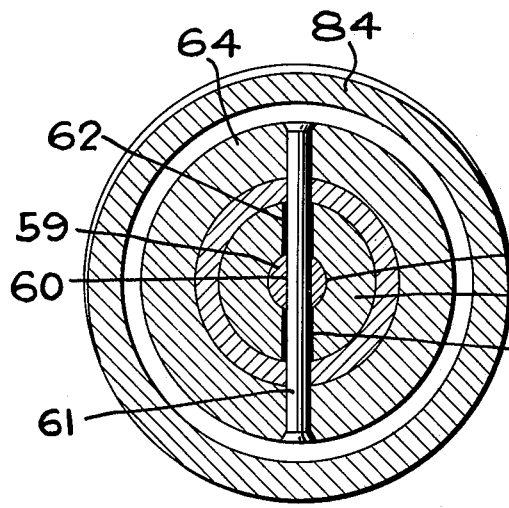

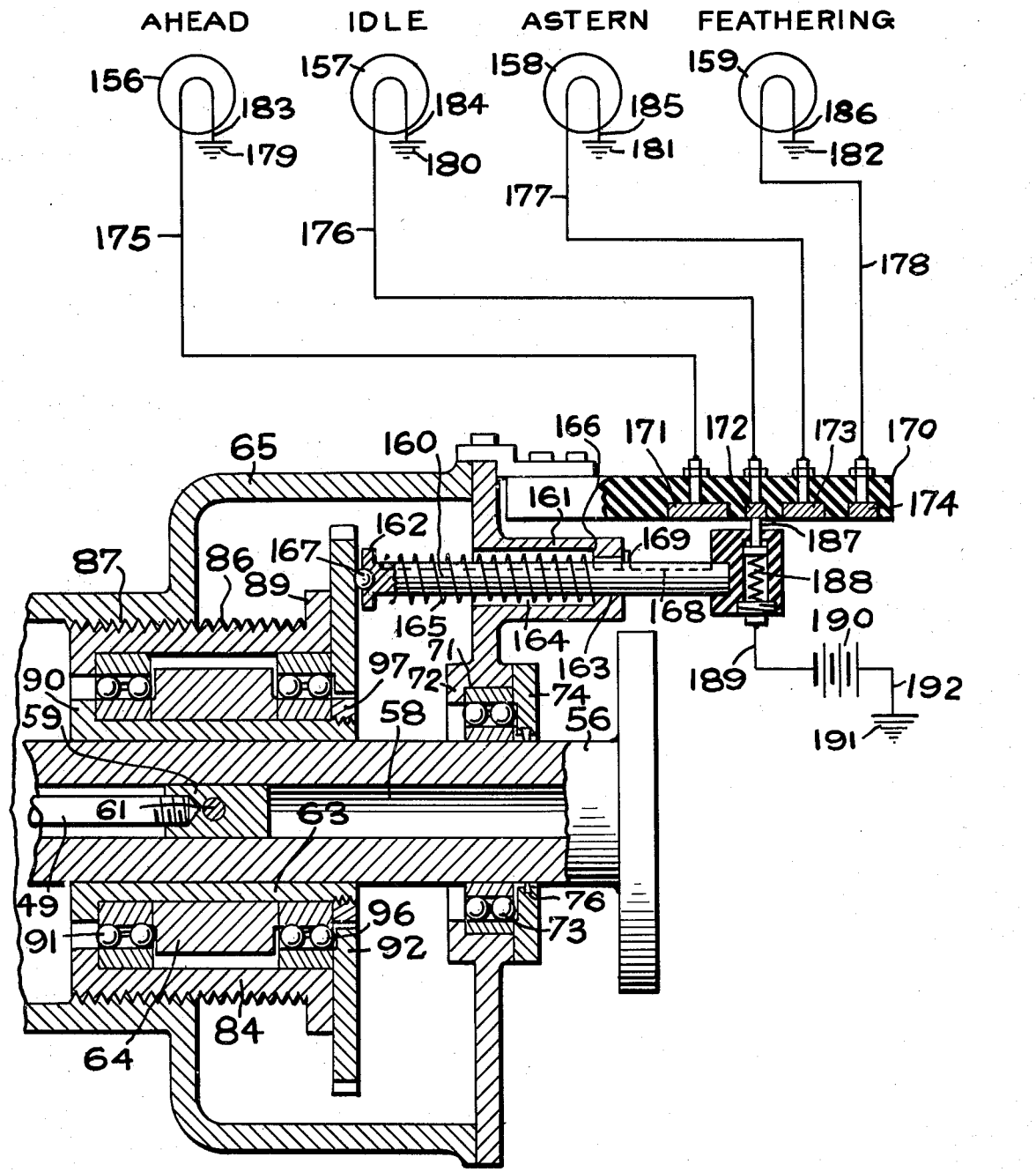

Patented Oct. 24, 1944

2,360,982

UNITED STATES PATENT OFFICE 2,360,982

REVERSIBLE SCREW PROPELLER OPERATING MECHANISM

Rolfe Sahle, York, Pa., assignor to S. Morgan Smith Company, York, Pa., a corporation of Pennsylvania Application July 3, 1942, Serial No. 449,550

3 Claims. (Cl. 170—163)

This invention relates to adjustable blade propellers, and more particularly to mechanism for operating the pitch-changing means of reversible screw propellers.

An object of the invention is to provide an improved reversible rotary blade propeller adapted to be directly connected with the power plant or engine of a boat for propelling the boat either "ahead" or "astern" without the necessity of utilizing the usual clutch and transmission.

Another object of the invention is to provide a propeller of the type mentioned having improved means associated therewith for causing a positive and reliable movement in unison of the propeller blades according to a simplified arrangement, so that the pilot or operator can quickly change, at will, to any selected pitch or degree for "ahead," "idle," "astern," or "feathering" position of the propeller blades.

Another object of the invention is to provide an improved adjustable blade propeller in which the trunnion of each propeller blade is formed with a pinion having teeth in meshing relationship with the teeth of a rack bar, all of the rack bars being slidably mounted within the hub and being connected to a crosshead mounted on the end of an actuator or rod disposed within a hollow shaft adapted to be directly connected to the shaft of an engine, the actuator rod being coupled to operating mechanism located in spaced relation to the hub and adapted to be actuated to move the actuator rod rectilinearly in the shaft by a reversible electric motor controlled by the pilot or operator.

Another object of the invention is to provide an improved adjustable blade propeller, which affords dependability, free action of the control, compactness and lightness in weight, freedom from slippage, inexpensiveness in manufacture and installation, and in which added power is produced to the infinite variation that is obtainable in setting.

Another object of the invention is to provide an improved operating mechanism for adjustable blade propellers adapted to be operated by a reversible electric motor directly connected to the blade operating mechanism and operable through the medium of remote control means.

Another object of the invention is to provide an improved operating mechanism for adjustable blade propellers adapted to be operated by a reversible electric motor and embodying a drum operatively connected to the pitch-changing means for the propeller blades and adapted to be moved axially with respect to the propeller in either a direction toward the hub or in the opposite direction away from the hub when rotated by the motor.

Another object of the invention is to provide an improved indicating mechanism including a plurality of incandescent electric light bulbs, each adapted to indicate a specific position of the blades of an adjustable blade propeller.

Another object of the invention is to provide an improved propeller blade positioning indicating system of the above type, in which means operated by the mechanism for changing the pitch of the propeller blades are adapted to selectively control the circuits of the electric lamps.

Another object of the invention is to provide an improved propeller blade position indicating system embodying a series of incandescent electric lamps, each lamp being adapted to indicate a specific position of the propeller blades, and an electric circuit for each lamp including a single switch member having a plurality of contact means, one contact being for each lamp circuit, respectively, and a movable electric switch member actuated by the propeller blade pitch-changing mechanism for selectively closing each lamp circuit.

Other advantages of the invention result from the fact that the propeller always runs in the same direction, even when the direction of the ship is reversed. The speed of the ship can be controlled independently of the speed of the engine. The operator or pilot can control the position of the propeller blades whether the engine is idle or operating. The pitch of the propeller blades and the motion of the ship are adapted to be controlled solely by an electric switch conveniently mounted on a control board or panel handy for the operator or pilot.

With these and other objects in view the invention consists in the construction and arrangements of parts hereinafter described and claimed.

In the accompanying drawings:

Fig. 2 is a vertical transverse section taken on the line 2—2 of Fig. 1;

Fig. 3 is a vertical longitudinal section taken on the line 3—3 of Fig. 1;

Fig. 4 is a vertical transverse section taken on the line 4—4 of Fig. 3;

Fig. 5 is an enlarged plan view of the propeller, with the deflector or cap removed from the hub, the propeller blades being shown in the neutral or idle position;

Fig. 6 is a view similar to Fig. 5 showing the propeller blade in an ahead position;

Fig. 7 is a view similar to Fig. 5 showing the propeller blade in an astern or reverse position;

Fig. 8 is a view similar to Fig. 5 showing the propeller blade in a feathering position;

Fig. 9 is a vertical transverse section taken on the line 9—9 of Fig. 7;

Fig. 10 is a vertical longitudinal section on the propeller blade operating mechanism;

Fig. 12 is a vertical transverse section taken on the line 12—12 of Fig. 10;

Fig. 13 is a diagrammatic view of the control system for the electric motor of the propeller blade operating mechanism shown in Fig. 10; and Fig. 14 is a horizontal section taken on the line 14—14 of Fig. 10, showing the propeller blade position indicating mechanism.

Figure 1:
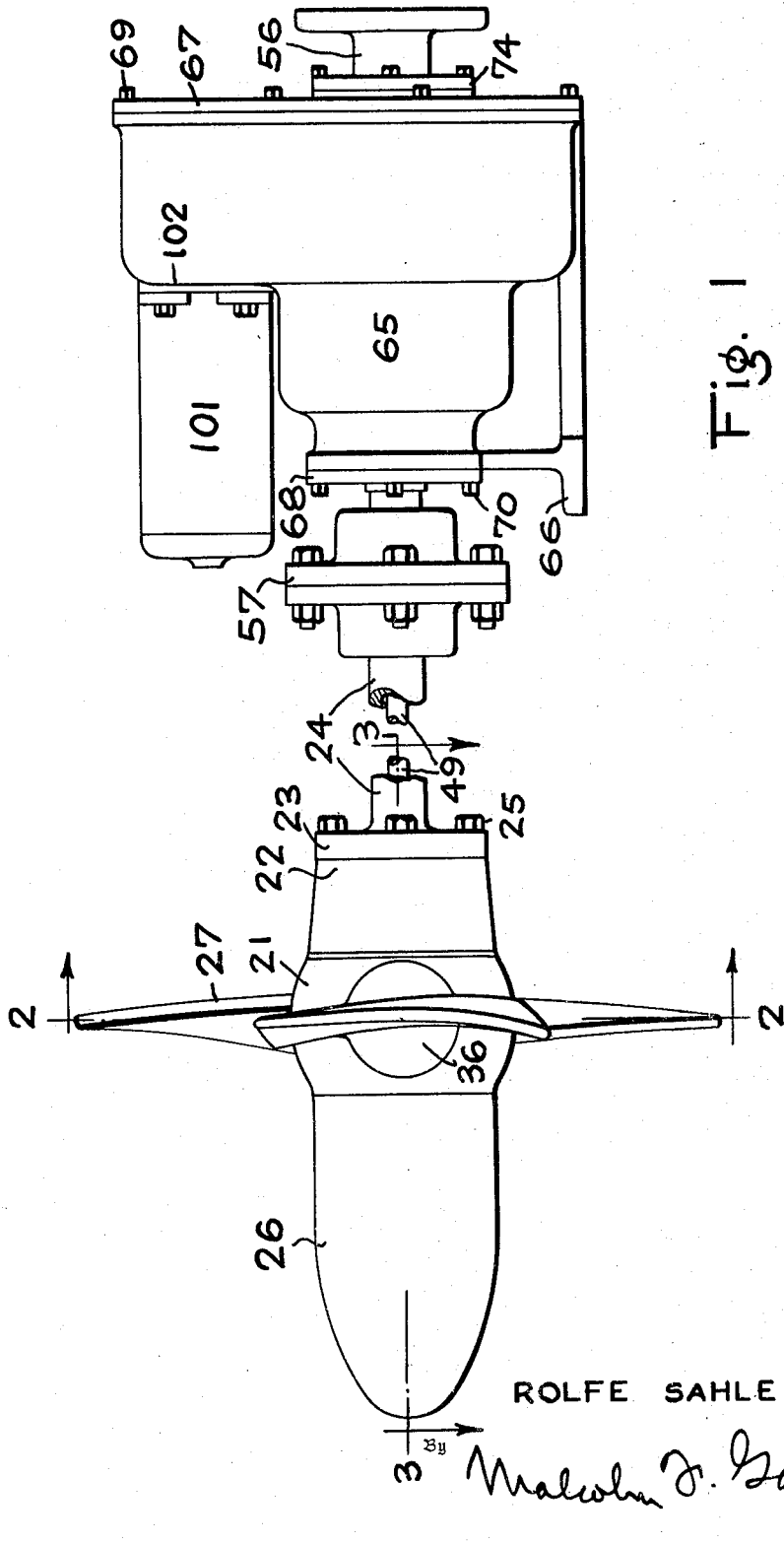
Fig. 1 is a side elevation of an adjustable blade propeller embodying the present invention.
Figure 11:
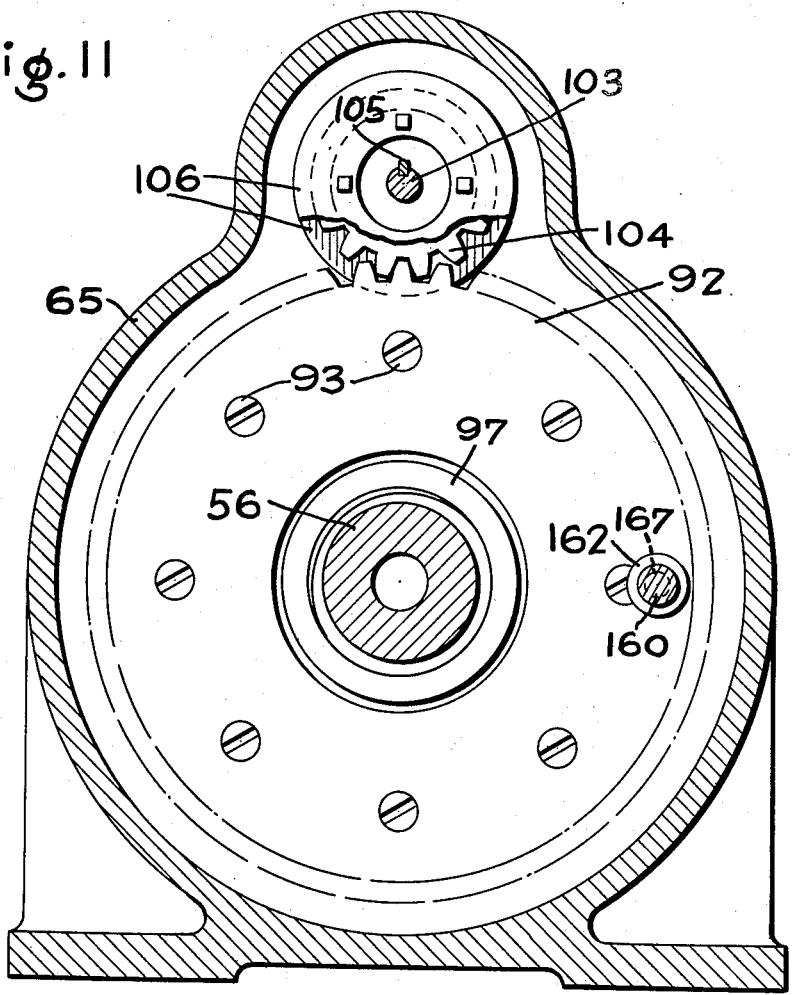
Fig. 11 is a vertical transverse section taken on the line 11—11 of Fig. 10.

In Figs. 1, 2, 3, 5 and 10, the parts are shown in the idle or neutral position of the propeller blades.

While the structure hereinafter described and illustrated in the accompanying drawings has been particularly designed for use on motor boats, ships, yachts and other types of marine vessels, it will be understood that the invention is also applicable to hydraulic machines, such as hydraulic turbines, pumps, and the like, as well as being adapted for use with wind driven impellers, airplane propellers, and the like. In fact, the invention is capable of being adapted for use with all types of rotors having adjustable blades.

Referring to the drawings and especially to Figs. 1 to 9 inclusive, the adjustable blade propeller comprises a hub 21 having an end portion 22 adapted to be connected to the flanged end 23 of a hollow shaft 24, by means of bolts or machine screws 25. The hub 21 is preferably formed of suitable cast material, and the end of the hub opposite to the end 22 is formed with screw threads 26 for the reception of a cap or deflector 26.

A suitable number of blades 27 are rotatably supported in the hub 21 of the propeller and project radially therefrom. In the present instance three blades are shown.

The hub 21 is formed with a longitudinal bore 28 which is located along the longitudinal center line of the shaft 24. The bore 28 extends through the main body of the hub, as shown in Fig. 3.

Also formed in the hub 21 is a plurality of recesses or cavities 29, there being one recess for each blade 27.

The recesses 29 are radially disposed with respect to the longitudinal center line of the hub, as shown in Fig. 2.

Each recess 29 is composed of three sections; namely, the inner section which is indicated by the reference numeral 29 and which inner section is of small diameter and extends outwardly from the longitudinal bore 28 for a suitable distance; second, the intermediate section 30, which is considerably larger in diameter than the size of the inner section 29; and, third, the outer section 31, which is somewhat larger in diameter than the diameter of the intermediate section 30.

Between the sections 29 and 30, there is a shoulder or wall 32, and between the sections 30 and 31, there is a shoulder or wall 33.

The inner end of each blade 27 is provided with a trunnion 34 which is journalled in the recess 29.

Each blade 27 is detachably secured to the trunnion 34 by means fo screws 35 which are passed through a flange 36 formed on the blade and which screws are threadedly mounted in openings 37 formed in the trunnions 34, as shown in Fig. 3.

The trunnion 34 is composed of several sections, each section having a different length and diameter, said sections corresponding somewhat in shape to the several sections of the recess, as will be described.

The inner section of the trunnion designated by the reference numeral 34 is rotatably mounted in the inner section 29 of the recess, as shown in Figs. 2 and 3.

The intermediate section of the trunnion is composed of two parts, namely, an inner portion formed with gear teeth and constituting a pinion 38, and a portion 39 of slightly greater diameter than the diameter of the pinion 38 so as to fit snugly and rotate within the recess 30. Both the pinion 38 and the portion 39 of the trunnion are disposed within recess 30, as shown in Figs. 2 and 3.

The outer portion 40 of the trunnion 34 which is adapted to be connected to the flange 36 of the blade 27 has a diameter slightly less than the maximum diameter of the trunnion so as to provide a shoulder 41 which is adapted to aline substantially with the shoulder 33 when the parts are assembled.

In order to retain the trunnion 34 in position within the recess 29, a thrust ring 42 is provided. The ring 42 has an outer diameter corresponding substantially to the diameter of the recess 31 and an inner diameter corresponding substantially to the diameter of the portion 40 of the trunnion. When the propeller is being constructed the trunnion, without the blade 27, is mounted in the recess, then the thrust ring 42 is mounted in the space surrounding the outer portion 40 of the trunnion, said thrust ring being fixed in position in the section 31 of the recess by screws 43 mounted in the main body of the hub. After the trunnion and the thrust ring are thus mounted in the hub 21, the blade 27 is mounted on the end of the trunnion and secured to the trunnion by the screws 35.

Anytime it is necessary to remove one of the blades 27 for inspection, repair or replacement, this operation can be readily accomplished without detaching the propeller from the shaft 24, by removing the screws 35.

When positioned in the recess 31, the inner portion of the thrust ring 42 bears against the shoulder 41 and thus retains the trunnion in position within the hub. The thrust ring 42 also prevents outward movement of the blade and its trunnion resulting from centrifugal forces produced by the rotation of the propeller, as will be understood.

Formed lengthwise in the hub 21 is a plurality of openings 46 which are arranged in parallel relationship to the axial bore 28. Each opening 46 is so disposed in the hub as to intersect the portion of the recess 30 in which the pinion 38 is disposed. In other words, for each recess 30 formed in the hub for a pinion 38 there is also formed in the hub an opening 46, and each opening 46 is located at one side of the axial center line of the trunnion 34.

Slidably mounted in each opening 46 is a bar 47 having teeth 48 formed along one side thereof and in meshing relationship with the teeth of the pinion 38.

For operating all of the rack bars or toothed bars 47 as a unit so that all of the pinions 38 are rotated equal degrees simultaneously in the same direction to thus maintain the propeller blades 27 in exactly the same position, a suitable unitary means is provided, said means preferably comprising an actuator or rod 49 slidably mounted in the bore 28 and terminating within the cap or deflector 26. The rod 49 has a crosshead or block 50 mounted on the end of the rod which is disposed within the cap 26, and each bar 47 is connected to the member 50, as indicated at 51, Figs. 5, 6, 7, 8 and 9.

The bars 47 are guided by the openings 46, and the latter are so constructed as to retain the teeth of said bars in meshing relationship with the teeth of the pinions 38, respectively, at all times.

The actuator or rod 49 extends through the shaft 24 and is adapted to be actuated by suitable mechanism, such as the mechanism shown in Fig. 10.

Adapted to be connected or coupled directly to the shaft of an internal combustion engine or other type of power plant having a rotatable shaft, is a shaft 56 which is adapted to have its other end connected to the shaft 24 by a suitable coupling 57.

The shaft 56 is formed with a longitudinal bore 58 which constitutes a continuation of the bore in the shaft 24.

The rod 49 extends through the shaft 24, passes through the coupling 57, and terminates at a suitable point intermediate the ends of the shaft 56.

Fixed to the end of the rod 49 which terminates within the shaft 56, is a block 59. The block 59 is slidably mounted in the bore 58 and is formed with a transverse opening 60 for a pin or rod 61.

The shaft 56 is formed with alined slots 62 having a width to receive the pin or rod 61.

Encircling the slotted portion of the shaft 56 is a sleeve 63 having a length somewhat greater than the length of the slots 62.

Mounted on the sleeve 63 is a collar 64.

The rod 61 is of sufficient length to pass diametrically through the shaft 56, the sleeve 63, and the collar 64. The ends of the rod 61 are upset, as shown in Fig. 10, so that said rod will be held from lengthwise movement thereof with respect to the collar.

Enclosing the major portion of the shaft 56 is a casing 65 having a base portion 66 by which said casing can be mounted on a suitable support (not shown).

One end of the casing 65 is closed by means of a cover plate 67, and the other end of the casing is closed by means of a cover plate 68.

The cover plate 67 is detachably secured to the end of the casing 65 by bolts 69 and the cover plate 68 is likewise secured to the opposite end of the casing by bolts 70.

The cover plate 67 is formed with an opening 71 through which the shaft 56 extends, said opening being somewhat larger in diameter than the diameter of the shaft.

Arranged on the inside of the cover plate 67 and surrounding the opening 71, is a flange 72 which provides a pocket for a ball bearing 73 mounted on the shaft 56.

Enclosing the outer portion of the ball bearing 73, is a ring or cover 74 which is detachably connected to the outer face of the cover plate 67 by screws or bolts 75.

In order to seal the joint between the inner periphery of the ring 74 and the exterior of the shaft 56, a seal 76 is mounted in the ring.

The cover plate 68 is formed with an opening 77 through which the shaft 56 extends, said opening being somewhat larger in diameter than the diameter of said shaft.

The end portion of the casing 65 adjacent to the end having the cover plate 68 is formed with a portion 78 constituting means for receiving a pair of ball bearings 79. The inner end of the portion 78 is formed with an annular flange 80 which prevents the bearings 79 from moving longitudinally inwardly of the casing. Outward longitudinal movement of the bearings 79 is prevented by the cover plate 68 which engages the outer ring or shell of said bearings and a disk 81 which is mounted on a threaded portion 82 of the shaft 56 in alinement with the cover plate 68 and engages the inner shell or ring of said bearings.

The disk 81 rotates with the shaft 56 and since the cover plate 68 is stationary, in order to seal the joint between said disk and said cover plate, a sealing ring 83 is provided.

Encircling the collar 64 and arranged in spaced relation to said collar is a drum 84, formed on its exterior with screw threads 86 which are in threaded engagement with screw threads 87 formed in the casing 65.

One end of the drum 84 is formed with an inwardly extending flange 88, and the other end of the drum is formed with an outwardly projecting flange 89.

The sleeve 63 has an outwardly projecting flange 90 formed on one end in alinement with the flange 88.

A ball bearing 91 which encircles the sleeve 63 is mounted in the space between the collar 64 and the flanges 88 and 90.

The end of the drum 84 opposite to the end having the bearing 91 carries a gear 92, said gear being secured to the flange 89 by screws or bolts 93. The gear 92 is formed with an opening 94 which is concentric with the gear and through which the shaft 56 passes. The diameter of the opening 94 and the arrangement of the gear on the drum 84 is such that a flange 95 is provided.

A ball bearing 96, similar to the bearing 91, encircles the sleeve 63, and is mounted in the space between the collar 64 and the flange 95, said flange 95 engaging the outer ring or shell of said bearing 96. A disk 97, which is mounted on a screw threaded portion 98 of the sleeve 63 in alinement with the flange 95, engages the inner shell or ring of the bearing 96.

Rotation of the shaft 56 is imparted by the pin or rod 61 to the sleeve 63 and also to the collar 64, so that these elements turn with the drive shaft 56. On the other hand, normally, the drum 84 does not rotate, and, therefore, it is the purpose of the bearings 91 and 96 to permit free rotation of the sleeve 63 and the collar 64 with respect to the normally stationary drum 84.

For the purpose of operating the gear 92, in the present embodiment of the invention an electric motor 101 is provided. The motor 101 can be secured to a wall 102 of the casing 65, as shown in Figs. 1 and 10.

Since the gear 92 is adapted to be rotated first in one direction and then in the opposite direction, the motor 101 should be any suitable type of reversible electric motor.

The armature of the motor 101 has a shaft 103 which projects into the interior of the casing between the wall 102 and the cover plate 67.

Slidably mounted on the shaft 103 is a pinion 104 which has teeth in meshing relationship with the teeth of the gear 92.

The shaft 103 carries an elongated key 105 so that rotation of said shaft is imparted to the pinion 104.

In order to retain the pinion 104 in alinement with the gear 92, each side of the pinion carries a ring 106.

The rings 106 have sufficient diameter so as to engage the outer peripheral portion of the gear 92. During the operation of the device, rotation of the gear 92 turns the threaded drum 84 either inwardly or outwardly with respect to the threaded portion 87 of the casing 65, and consequently the gear 92, the collar 64, and the rod 49, as well as the drum 84, are all moved longitudinally either in one direction or in the other direction with respect to the shaft 56. This longitudinal shifting movement of the gear 92 is also imparted by the rings 106 to the pinion 104, so that said gear and said pinion are thus retained by the rings 106 in the same relative position at all times.

The complete operation of the apparatus will be hereinafter more fully described.

For the purpose of effecting operation of the electric motor 101, a suitable control system has been provided, as shown in Fig. 13.

The motor control system comprises a double pole snap switch device 111 having a normally open movable contact member 112.

A single source of supply of electric energy, such as a storage battery 113, has one terminal connected to a ground 114, by a wire 115, and connected to the other terminal of said battery is a wire 116 which is connected to a junction 117.

The junction 117 is connected to another junction 118, by a wire 119.

The junction 118 is connected to a contact 120 of the switch 111, by a wire 121, said junction being also connected to a contact 122 of the switch 111, by a wire 123.

Another contact 125 of the switch 111 is connected by a wire 124 to one terminal of a solenoid coil 126.

The other terminal of the coil 126 is connected to a ground 127, by a wire 128.

Another contact 129 of the switch 111 is connected by a wire 130 to one terminal of a solenoid coil 131.

The other terminal of the coil 131 is connected to a ground 132, by a wire 133.

Operated by the solenoid coil 126 is a switch comprising a plunger 134 carrying a contact 135, and a pair of fixed contacts 136 and 137 adapted to be connected by the movable contact 135 when the coil 126 is energized.

The fixed contact 136 is connected to terminal 138 of the motor 101, by a wire 139.

The fixed contact 137 is connected to a junction 140 by a wire 141, and the junction 140 is connected to the junction 117 by a wire 142.

Operated by the solenoid coil 131 is a switch comprising the solenoid plunger 143, carrying a contact 144, said switch also including a pair of fixed contacts 145 and 146 adapted to be connected by the movable contact 144 when the coil 131 is energized.

The fixed contact 145 is connected to a terminal 147 of the motor 101, by a wire 148.

The fixed contact 146 is connected to the junction 140, by a wire 149.

The third terminal 150 of the motor 101 is connected to a ground 151, by a wire 152.

The solenoid switch 135 is adapted to control an electric circuit by which current is supplied to the motor 101 to operate said motor to effect operation of the blade actuating mechanism in the direction in which the propeller blades 27 are turned towards "ahead" position, and the solenoid switch 144 is adapted to control an electric circuit by which current is supplied to the motor 101 so that said motor is operated in the reverse direction to thereby effect operation of the blade actuating mechanism in the direction in which the propeller blades 27 are turned towards "astern" position.

Assuming that the propeller is installed on the end of the propeller shaft of a marine vessel, such as a boat, ship or yacht, and that the blades of the propeller are disposed in the neutral or idle position shown in Figs. 1 and 5, and that the boat is moored and its power plant or engine idle, when it is desired to get the boat in motion, the engine is first started, and since the engine is directly connected to the propeller by the shafts 56 and 24, the propeller will be rotated by the engine, but no motion will be produced by the propeller that will move the boat either ahead or astern. Thus, due to the position of the blades in the position shown in Fig. 5, the blades merely cut the water as the propeller rotates, and the engine can be operated at predetermined operating speed.

Should it now be desired to move the boat backwardly out of a slip, the pilot or operator operates the movable contact 112 of the switch 111 to connect contacts 120 and 129.

When the coil 131 is deenergized, the solenoid plunger 143 will be down so that the movable contact 144 will be disconnected from the fixed contacts 145 and 146.

Operation of the switch member 112 to the position in which contact 120 is connected to contact 129, closes the electric circuit through which the solenoid coil 131 is energized from the storage battery 113, through wires 116, 119 and 121, switch member 112, wire 130, coil 131, and wire 133, to the ground 132.

When the solenoid coil 131 is energized the movable contact 144 connects the fixed contacts 145 and 146, thereby closing the circuit through which the reverse windings of the electric motor 101 are supplied with electric energy from the storage battery 113, through wires 116, 142 and 149, contact 144, and wire 148 to the motor terminal 147, and from the motor terminal 150, through wire 152 to the ground 151.

The electric motor 101 then operates in the direction in which the drum 84 is rotated by the pinion 104 and the gear 92 so that said drum is unscrewed or moved in the direction of the arrow A, Fig. 10, with respect to the casing 65.

The longitudinal or axial movement of the drum 84 is transmitted by the collar 64 and the pin or rod 61 to the block 59, so that the rod 49 is also moved axially within the shafts 56 and 24 in the same direction as the axial movement of the drum 84 and for a corresponding distance.

The rectilinear or axial movement of the rod 49 is effective to impart a corresponding movement to the rack bars or toothed bars 47, and consequently the pinions 38 are rotated in the direction of the arrow, Fig. 7, so that the propeller blades 27 are turned from the idle or crosswise position shown in Fig. 5 toward the reverse or astern position shown in Fig. 7.

After the propeller blades 27 have been turned to the desired astern or reverse position, the switch member 112 is snapped back to its open position of the switch, thereby opening the circuit through which the solenoid coil is energized. The plunger 143 then moves the contact 144 out of engagement from the contacts 145 and 146, thereby opening the circuit through which the motor 101 is supplied with electric energy from the storage battery 113. The motor 101 then ceases to operate and consequently the drum 84 ceases to turn outwardly in the direction of the arrow A, Fig. 10. The operating mechanism for turning the propeller blades 27 will remain stationary and in the position now set, as the result of the operation of the motor 101, as described.

In accomplishing the above operation, in order to set the propeller blades in the "astern" or the "reverse" position, it is to be understood that the engine which drives the shafts 56 and 24 is maintained at one operating speed or R. P. M. Thus, the speed of the engine is set at a constant number of R. P. M. and the speed at which it is desired to propel the boat is determined by the position or angle at which the propeller blades 27 are disposed.

After the ship has moved "astern" the desired distance, and when it is desired to have the ship move "ahead," the pilot or operator turns the switch member 112 to the position in which the contacts 122 and 125 are connected. This closes the circuit through which the solenoid coil 126 is energized from the storage battery 113, through wires 116, 119, and 123, switch 112, wire 124, coil 126, and wire 128, to the ground 127.

When the solenoid coil 126 is energized, the movable contact 135 connects the fixed contacts 136 and 137, thereby closing the electric circuit through which the "ahead" windings of the electric motor 101 are supplied with electric energy from the storage battery 113, through wires 116, 142 and 141, contact 135, and wire 139 to motor terminal 138, and from motor terminal 150, through wire 152 to the ground 151.

The electric motor 101 then operates in the direction in which the drum 84 is rotated by the pinion 104 and the gear 92 so that said drum is screwed or moved into the threaded portion of the casing 65, in the direction of the arrow B, Fig. 10.

The longitudinal or axial movement of the drum 84 is transmitted to the rod 49 in the manner heretofore described, so that the rod 49 is also moved axially within the shafts 56 and 24 in the same direction as the axial movement of the drum 84, and for a corresponding distance.

The axial movement of the rod 49 imparts a corresponding movement to the rack bars or toothed bars 47, so that the pinions 38 are rotated in the direction of the arrow, Fig. 6. The propeller blades 27 are thus turned from a position, such as the position shown in Fig. 7 towards a "forward" or "ahead" position, such as the position shown in Fig. 6. In moving from an "astern" position toward an "ahead" position the propeller blades move past the idle or neutral position, shown in Fig. 5, and as soon as the pitch of the blades passes the idle position, driving power for moving the boat "ahead" will be had.

After the propeller blades 27 have been turned to the desired "ahead" or "forward" position, the switch member 112 of the switch 111 is snapped back to its open position, thereby opening the circuit through which the solenoid coil 126 is energized, so that the coil 126 is deenergized. The plunger 134 then moves the contact 135 away from the contacts 136 and 137, thereby opening the circuit through which the motor 101 is supplied with electric energy from the storage battery 113. The motor then ceases to operate and consequently the longitudinal shifting movement of the blade operating mechanism ceases. The blades will then remain in their set position until the controls for the motor 101 are again actuated.

When the motor 101 operates to turn the drum 84 in either direction, the bearings 91 and 96 which are mounted within the drum, take the thrust transmitted from the propeller blades 27, through the pinions 38, rack bars 47, crosshead 50, operating rod 49, pin or rod 61, to the collar 64.

The purpose of the bearing 79 is to take the thrust in either the "ahead" or the "astern" motion of the ship.

It will be noted by referring to Figs. 5, 6, 7, 8 and 10, that the mechanism for adjusting the pitch of the propeller blades 27 is designed to turn the blades from a "feathering" position, shown in Fig. 8, through an angle of approximately 180 degrees to another "feathering" position which can be obtained were the propeller blades turned further in the direction of the "ahead" position shown in Fig. 6 to a position corresponding substantially with the longitudinal center line of the hub 21. Thus, should the propeller blades be disposed in the position shown in Fig. 6, and it is desired to set the blades in a "feathering" position, the switch 111 can be operated to effect rotation of the propeller blades in the direction of the arrow, Fig. 6, until such propeller blades are in a "feathering" position.

On the other hand, should it be desired to turn the propeller blades to a "feathering" position, when such blades are in the "reverse" position, such as the position shown in Fig. 7, then the switch 112 can be operated to effect the positioning of the propeller blades in the "feathering" position shown in Fig. 8.

The "feathering" position of the propeller blades is usually employed when the device is installed with auxiliary power of sailing yachts. When yachts are under sail it is desirable to set the propeller blades in a "feathering" position so as to reduce the frictional resistance of the propeller as much as possible.

When so desired, means may be provided for visibly indicating to the pilot or operator the position of the propeller blades. In actual practice it has been found desirable to locate the push button switches 111 and 112 at a point within easy reach of the pilot or operator. Also located at a point easily visible by the pilot or operator may be an instrument panel on which is placed suitable propeller blade position indicating means, such as the incandescent lamps shown in Fig. 14.

In the embodiment of the invention herein described the propeller blade position indicating means includes four incandescent electric lamps 156, 157, 158 and 159 which, respectively, are adapted to indicate the "ahead," "idle," "astern," and "feathering" positions of the propeller blades.

The lamps 156, 157, 158 and 159 are adapted to be selectively and separately illuminated automatically by mechanism operatively connected to the propeller blade operating mechanism and actuated thereby.

The mechanism for illuminating the electric lamps 156, 157, 158 and 159 comprises a plunger or movable contact arm 160 mounted in a boss 161 formed on the cover plate 67 of the operating mechanism casing 65.

The plunger or movable contact arm 160 is arranged for sliding movements parallel with the longitudinal center line of the shaft 56, said arm having an inner end formed with a flange 162.

The boss 161 is formed with an outer opening 163 which snugly fits the plunger or contact arm 160 and inwardly of the opening 163, the boss is formed with an enlarged elongated opening 164 which constitutes a cavity for a coil spring 165, which encircles the plunger 160.

One end of the spring 165 bears against the flange 162 and the other end of said spring bears against the wall 166 at the outer end of the cavity 164.

The inner end of the plunger 160 is provided with suitable anti-friction means, such as a ball 167.

The construction of the parts is such that the spring 165 maintains the ball 167 in contact with the outer face of the gear 92 at all times, consequently, any movement of the drum 84 lengthwise with respect to the shaft 56 effects a corresponding rectilinear movement of the plunger 160 in the same direction.

Fixed to the stationary casing 65, or, as shown in Fig. 14, fixed to the cover plate 67 and projecting outwardly from said cover in parallel relationship to the plunger 160, is a bar 170, preferably formed of suitable electrical insulating material.

Mounted in the bar 170 is a plurality of contacts 171, 172, 173 and 174.

The contact 171 is electrically connected to the electric lamp 156 by a wire 175, and the contacts 172, 173 and 174 are likewise connected to the lamps 157, 158 and 159 by wires 176, 177 and 178, respectively.

The wires 175, 176, 177 and 178 are connected to one terminal of the lamps 156, 157, 158 and 159, respectively, and the other terminals of said lamps are connected to grounds 179, 180, 181 and 182, by wires 183, 184, 185 and 186, respectively.

Carried by the outer end of the plunger 160 is a contact 187 which is urged into engagement with the several contacts on the bar 170 by a coil spring 188.

The contact 187 is electrically connected in any suitable manner by a wire 189 to one terminal of a storage battery 190. The other terminal of the storage battery 190 is connected to a ground 191, by a wire 192.

In order to retain the plunger 160 in position so that the contact 187 will always be in position to engage the contacts of the bar 170, the plunger 160 may be formed with a longitudinal slot 168 for receiving a key 169 carried by the boss 161.

The electric lamps 156, 157, 158 and 159 may each be of a different color, so that when said lamps are illuminated, the pilot or operator can determine from the color the relative position of the propeller blades. Also the panel on which said lamps are mounted can be provided with suitable indicia to designate the respective positions of the propeller blades which the lamps indicate.

When the parts are in the idle position shown in Fig. 14, which position corresponds to the position shown in Figs. 1, 5 and 10, contact 187 will engage contact 172, thereby closing the electric circuit from the storage battery 190 to the lamp 157, so that said lamp 157 will be illuminated and thus indicate that the propeller blades are in the neutral or idle position.

When the drum 84 is actuated in the manner heretofore described to change the pitch of the propeller blades, the contact 187 will be moved away from the contact 172 and into engagement with either of the other contacts 171, 173 or 174, thereby closing the electrical circuit to the lamps 156, 158 or 159, respectively, so that one of said lamps is illuminated. In this way means have been provided for visibly indicating the respective positions of the propeller blades.

The control system for the motor 101 hereinbefore described, is claimed in my copending application Serial No. 449,377, filed July 2, 1942.

Having thus described my invention, what I claim is:

1. A propeller comprising a hollow shaft, a hub on said shaft, a plurality of blades rotatably carried by said hub, pitch-changing means operatively connected with said blades and including an actuator rod movable longitudinally within said hub and said shaft, a casing surrounding said shaft and having an internally screw threaded portion arranged concentrically in spaced relation to said shaft, a drum having exterior screw threads engaging said internally threaded casing, means operatively connecting said drum with said actuator rod whereby said shaft and said actuator rod are free to rotate with respect to said drum, said drum being adapted to be turned either inwardly or outwardly with respect to said threaded portion of said casing to thereby impart longitudinal movement of the actuator rod so as to change the pitch of said propeller blades, a gear fixed to an end of said drum for rotating said drum, a reversible electric motor having an elongated shaft operated by said motor, a pinion slidably mounted on said motor shaft and having teeth in meshing relationship with the teeth of said gear, and means carried by said pinion and engageable with said gear whereby longitudinal movement of the gear is transmitted to said pinion so as to maintain said pinion alined with said gear at all times.

2. A propeller comprising a hollow shaft, a hub on said shaft, a plurality of blades rotatably carried by said hub, pitch-changing means operatively connected with said blades and including an actuator rod extending longitudinally within said shaft, a casing surrounding said shaft, bearings carried by said casing for rotatably supporting said shaft, an internally screw threaded portion formed within said casing and arranged concentrically in spaced relation to said shaft, a drum having screw threads engaging said internally threaded casing, said drum being adapted to be turned either inwardly or outwardly with respect to said threaded portion of said casing, whereby said drum moves longitudinally on said shaft, said drum being arranged in spaced relation to said shaft, a sleeve slidably mounted on said shaft and arranged within said drum, said sleeve being rotatable with said shaft, bearings interposed between said sleeve and said drum whereby said sleeve is freely rotatable with respect to said drum, a slot formed diametrically through said shaft in alinement with the outer end portion of said actuator rod, a pin carried by said actuator rod and disposed in said slot and operatively connected with said sleeve, a gear fixed to an end of said drum for rotating the drum, a reversible motor, and a pinion carried by the motor shaft and having teeth in meshing relationship with the teeth of said gear, said motor being located on the exterior of said casing and said pinion and said drum gear being enclosed by said casing, said pinion being slidably mounted on the motor shaft so that said pinion will be in mesh with said gear irrespective of the disposition of the drum within the casing.

3. A propeller comprising a hollow shaft, a hub on said shaft, a plurality of blades rotatably carried by said hub, pitch-changing means operatively connected with said blades and including an actuator rod movable longitudinally within said hub and said shaft, a casing surrounding said shaft and having an internally screw threaded portion arranged concentrically in spaced relation to said shaft, a drum having exterior screw threads engaging said internally threaded casing, means operatively connecting said drum with said actuator rod whereby said shaft and said actuator rod are free to rotate with respect to said drum, said drum being adapted to be turned either inwardly or outwardly with respect to said threaded portion of said casing to thereby impart longitudinal movement of the actuator rod so as to change the pitch of said propeller blades, a gear fixed to an end of said drum for rotating said drum, means for operating said gear for moving said drum longitudinally within the casing to actuate the pitch-changing means to turn said propeller blades, a plunger slidably mounted within the casing and having one end in engagement with a face of said gear, the other end of said plunger projecting outwardly through an end wall of the casing, means for retaining the end of said plunger in engagement with the face of said gear at all times, a plurality of electric lamps, each lamp being adapted to indicate a specific position of said blades, an electric circuit for each lamp and including a bar rigidly connected with said casing and carrying a plurality of contacts, each contact being adapted to be electrically connected with a lamp, and means on said plunger for engaging said contacts for selectively connecting each lamp contact with a source of electric energy whereby a single lamp will be illuminated when the propeller blades are disposed in a predetermined position.

ROLFE SAHLE.